Sept. 29, 1964  S. K. STAUTH  3,150,756
ELEVATOR HITCH
Filed June 29, 1961
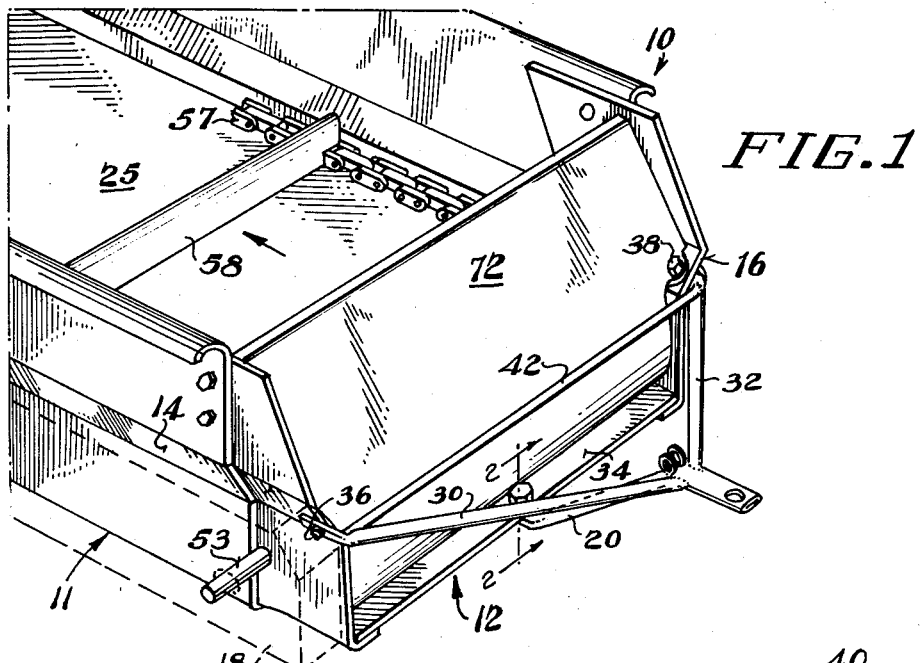
FIG.1
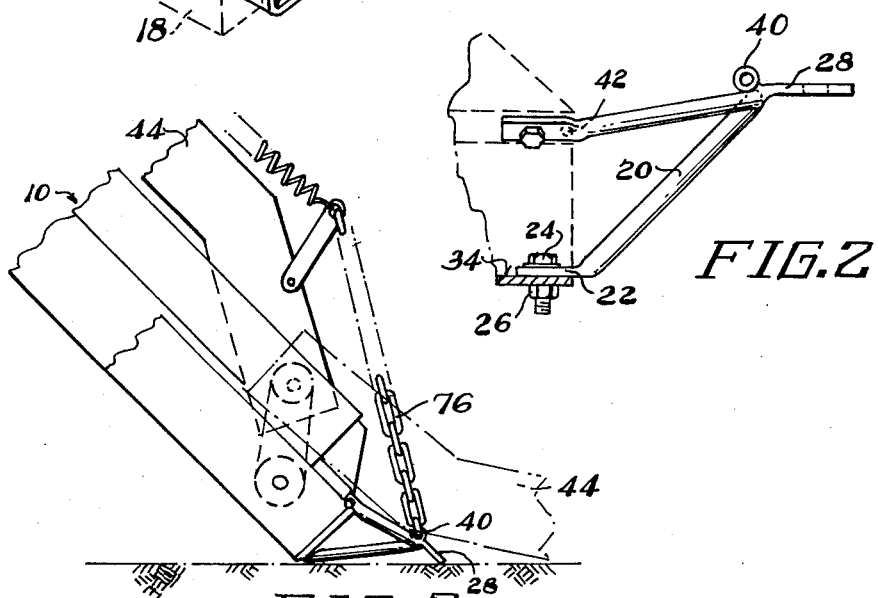
FIG.2
FIG.3
S. K. STAUTH,
INVENTOR.
BY Homer C. Montague
atty.

3,150,756
ELEVATOR HITCH
Samuel K. Stauth, Compton, Ill., assignor to Mayrath Company, a corporation of Illinois
Filed June 29, 1691, Ser. No. 120,767
3 Claims. (Cl. 198—1)

This invention pertains to mobile power conveyors of the elevating type, and in particular to an improved hitch or towing connection by which a prime mover or towing vehicle can be used to transport the conveyor from place to place. More especially, the invention aims to provide a simple but strong and rigid hitch which can be used for the safe towage of the longest, widest-gauge and heaviest mobile conveyors, such as rectangular-section double-chain raddle type elevators.

Among important objects of the invention are the provision of a hitch which connects to three widely-spaced points of the elevator end structure, including the widely spaced side walls and the bottom wall thereof, to provide a towing axis generally aligned with the mid-plane of the elevator, but which will not have to be removed during any normal usage of the elevator. Thus, the arrangement is designed so that even with extreme elevation angles, the hitch will not prevent the lower or intake end of the elevator from resting upon the ground, which is the preferred loading position.

A further advantage of the invention is the fact that the installed hitch will not interfere with the full range of angulation of an auxiliary or "feeder" conveyor connected to the elevator for swinging to a variety of use positions, as well as to an up-folded position overlying the elevator, for easy transport of the combination.

Still another advantage of the novel hitch is the inclusion of means acting to distribute the towing stresses to spaced parts of the elevator end structure, yet which will not operate to bend or distort the panels or plates of that structure, and which will in fact even exert a rigidifying effect on the elevator end when the apparatus is in use; for example, when the "towing" end is in contact with the ground.

A further advantage derives from the provision, in the hitch, of a rugged connecting means for receiving the end of a chain forming part of a known counter-balance arrangement for the swing-over feeder trough, so that the geometry of such arrangement is definitely established, for greater safety and reliability of operation as compared with prior-art arbitrary connections heretofore employed.

In general, the above advantages are obtained by a hitch connection based on the principle of triangular rigidity, and having a substantially unitary or one-piece construction including a main tubular element having flattened and angulated ends for connection respectively to the center of the bottom panel of a conveyor or elevator trough, and to the prime mover in a mid-plane of the elevator trough; together with a pair of tubular side brace elements extending from near the outboard end of the main tubular element to the respective side panels or trough walls of the conveyor. The construction also includes a rigid spreader bar integrally connected to, and extending horizontally between, the inboard end portions of said side braces, near their points of connection to the elevator side walls. Finally, the main tubular element is provided, near its outboard end, with a pair of open rings adapted for securing one end of a counter-balance chain.

The invention will best be understood by referring now to the following detailed specification of a preferred form thereof, taken in connection with the appended drawings, in which:

FIG. 1 is a perspective view of the towing end structure of a typical mobile elevating conveyor, showing the novel hitch connected thereto.

FIG. 2 is a view in side elevation of the hitch structure itself, with certain parts of the conveyor indicated schematically and in section taken on line 2—2 of FIG. 1.

FIG. 3 is a schematic view in partial side elevation of the invention as applied to an elevator including an auxiliary or feeder conveyor of the swing-over type, the latter being shown in full lines in its folded position, and by dash lines in its operating position.

Since the present invention depends for its subject-matter upon the construction of the novel hitch means, especially as adapted to a particular type of elevating conveyor, the constructional details and manner of operation of the conveyor itself have been omitted wherever they are unnecessary to an understanding of the hitch portion. For information as to such omitted aspects, reference is made to the copending application of Martin Mayrath, Serial No. 96,270, filed March 16, 1961, now abandoned, and to U.S. Patent No. 2,921,666, issued January 19, 1960. The disclosures of these prior cases are to be considered as included in and forming a part of the present disclosure.

Referring first to FIG. 1 of the drawings, numeral 10 designates as a whole a conveyor of the chain elevating type, only the normally lower or intake end thereof being shown. A complete conveyor of this type would include a wheeled supporting framework and a power source and drive for the conveyor chains, as fully described in the previous cases referred to above. The conveyor includes an elongated trough structure 11 having fixed at its lower end a boot 12 including a shield 72 as described in the copending application mentioned above. The side walls of this boot are shaped to lie within and against the side walls of the trough 11, and may thus include inclined transition panel sections 14, 16. A bottom panel 34 of boot 12 forms a continuation of the bottom of trough 11, and an intermediate trough pan 25 is secured between the side walls of trough 11. Chains (such as chain 57) travel along pan 25 and drive the conveyor flights (such as 58) upward to elevate the load, returning via the lower trough portion beneath pan 25.

A drive shaft 53, suitably journalled in the trough (or boot) side walls, is connected to drive the chains by sprockets (not shown) on the shaft; its protruding end in FIG. 1 would be connected by belt and pulley means, or the like, to a power source such as an engine. A cover or housing 18 for the belt and pulley is a usual provision, but is shown in dash lines to avoid obscuring one of the hitch connnections.

The novel hitch of the invention is connected to the conveyor trough walls (or those of boot 12) at three spaced points, by readily removable fastenings. Thus, from the center of the rear margin of floor 34 there extends upwardly and "forwardly" (of FIG. 1) a tubular element 20 whose lower end is flattened as at 22 in FIG. 2, for connection to floor 34 as by a bolt 24, nut 26 and suitable washers. The upper end of element 20 is also flattened as at 28, and perforated for connection to a prime mover, either directly, by a chain, or in any desired manner. The end 28 lies in a central plane with respect to the vertical dimension of trough 11.

A pair of angled lateral tubular elements 30 and 32 are welded to element 20 near its upper bend, and extend to the side walls of boot 12 (or trough 11). Preferably, and in connection with the conveyor shown, the fastenings are made to the inclined transition portions corresponding to panels 14 and 16 of trough 11, the ends of elements 30 and 32 being also flattened, angled to conform to the wall structure inclination, and perforated for connection thereto as by bolts 36 and 38.

Where elements 30 and 32 meet and are welded to element 20, that is, at its upper bend, there are also welded to element 20 a pair of parallel apertured lugs (or washers) 40, for a purpose to be described.

Extending between the flattened ends of tubular elements 30 and 32 is a tie rod or spreader 42, welded in place to establish and maintain the spacing of these ends at the proper distance to agree with the width of the conveyor trough (or boot) and thus to prevent distortion of the latter as might occur if tension or compression directed along the hitch axis were sufficient to change the angulation of elements 30 and 32.

It will be observed from the foregoing that the upward inclination of tubular element 20, which places portion 28 in or near the mid-plane of trough 11, permits an extreme upward inclination of the conveyor without raising the boot above ground level to any substantial degree. FIG. 3 illustrates this feature, for an elevator inclination of 45 degrees.

Conveyors of this type, and as illustrated in U.S. Patent No. 2,921,666, are often provided with a "feeder" conveyor which permits material to be loaded from a considerable distance away from the bottom end of the main conveyor. In that patent, a feeder conveyor 44 is shown as hinged to the main conveyor or elevator (see FIG. 3 of the drawings of this present application) for movement from a solid-line position (for transport) to a dash-line position of use. The spring type safety counterbalance of the prior patent requires that a limit chain 76 have one end connected to a part of the hitch lying forward of the boot 11. Rings or washers 40 of the present construction provide a rugged and convenient point of attachment for this chain, accurately defining the point of connection for proper operation of the counter-balance parts.

It will be seen that while the upward inclination of element 20 allows large tilt angles for the main conveyor, as in FIG. 3, the fact that it terminates in or near the mid-plane of the trough allows the feeder conveyor 44 to be swung to the lowest position required for its usage. That is, the hitch does not interfere with the operation of either the main or feeder conveyors. The distribution of stress along the three tubular elements enables the use of a minimum amount of material for a given over-all strength, and the same arrangement ensures against any stress concentrations tending to damage the sheet metal parts of the elevator or its boot.

What is claimed is:

1. In combination, a lengthy conveyor including a trough defining at one end a pair of side walls and a floor panel, and a towing hitch comprising three arms diverging mutually from a common point lying substantially in the horizontal and vertical longitudinal mid-planes of said trough longitudinally beyond one end thereof; two of said arms having their extremities connected directly to margins of said side walls midway of their vertical height, and the third arm being connected directly to a center region of the margin of said floor panel; and a hitch connection element integrally secured to the terminals of all of said arms at said common point.

2. The combination of claim 1, in which said hitch connection element comprises a flat, forwardly-extending end portion of said third arm.

3. The combination of claim 1, including a rigid spreader bar extending between, and integrally connected to, the ends of said two of said arms adjacent to the points of their connection to said side walls.

References Cited in the file of this patent

UNITED STATES PATENTS

| | | |
|---|---|---|
| 2,760,622 | Magee | Aug. 28, 1956 |
| 2,921,666 | Stauth | Jan. 19, 1960 |